No. 631,684. Patented Aug. 22, 1899.
G. WAGNER.
CIRCULAR SAW.
(Application filed Jan. 14, 1898.)
(No Model.)
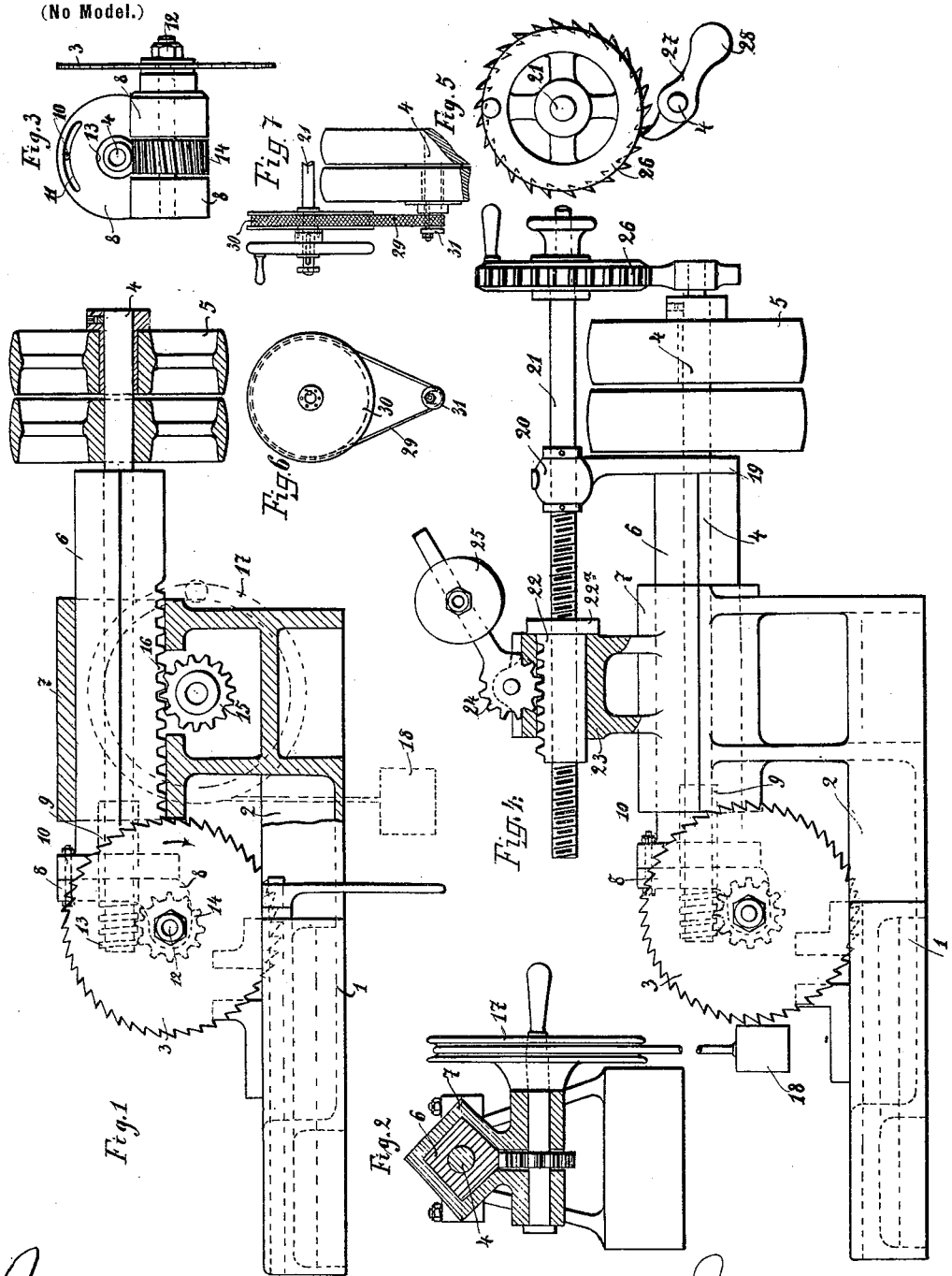

UNITED STATES PATENT OFFICE.

GUSTAV WAGNER, OF REUTLINGEN, GERMANY.

CIRCULAR SAW.

SPECIFICATION forming part of Letters Patent No. 631,684, dated August 22, 1899.

Application filed January 14, 1898. Serial No. 666,599. (No model.)

*To all whom it may concern:*

Be it known that I, GUSTAV WAGNER, of Reutlingen, in the Kingdom of Würtemberg, German Empire, have invented Improvements in Circular Saws, of which the following is a specification, reference being had therein to the accompanying drawings.

The object of the present invention consists of an improvement in circular saws chiefly characterized by the arrangement that, combined with a continuous advance of the saw, an adjustment of the saw itself is rendered possible in the simplest manner. Moreover, in this machine the parts effecting the continuous yielding advance are constructed in the simplest manner, which considerably reduces the labor with such machines.

The machine in question is illustrated in the drawings, in which—

Figure 1 shows it partly in elevation and partly in section. Fig. 2 shows a transverse section through the machine. Fig. 3 shows a view of the head of the saw. Fig. 4 shows another modification of the continuous advancing mechanism. Fig. 5 shows a view of the reversing mechanism, and Figs. 6 and 7 show details.

The machine-bed 1 of the machine contains a basin 2, which is usually filled with water, so that the saw 3 in the case of a vertical or slightly-inclined position can run completely in water, and thus remains cool, and there can under normal circumstances be a very great speed of rotation imparted to the saw.

The axle 4, which conveys the motion of the pulley 5 to the saw, is supported in a quadrangular sliding piece 6, which is arranged in the box 7, adjustable in the horizontal direction. The said piece 6 possesses in front a head 8, which is supported revolubly with a box 9 in the said sliding piece 6, turning about the center of the shaft 4. The head 8 can be revolved around the axis of the axle 4 by means of a screw 10, which is supported in the concentric slot 11 in the said head 8, and the head can be fixed in any position, so that the adjustment of the saw 3 in every direction can be effected, because the said saw 3 is supported in the head 8 by means of the axle 12. The transmission of the motion of the axle 4 to the saw is effected by means of the worm 13 and the worm-wheel 14. In this manner there is therefore provided an adjustment of the saw to any angle in the simplest possible manner by releasing the screw 10 and turning about of the head 8. Moreover, the whole mechanism is movable by means of the quadrangular sliding piece 6 on the bed 7.

In the machine illustrated in Fig. 1 the continuous advance is obtained by the arrangement that in the frame 1 a tooth-wheel 15 engages in the lower part of the sliding frame constructed as a rack 16. Upon the tooth-wheel shaft is placed outside a disk 17, which disk has imparted to it by means of a cord and a weight 18 the continuous effect to revolve the tooth-wheel and thereby to advance the sliding piece. The advance is consequently rendered continuous and also yielding.

Fig. 4 illustrates another modification of the continuous yielding advancing mechanism. The sliding piece 6 bears at its hinder end an arm 19, provided with eyelet-bearings 20. The said eyelet 20 is connected with a spindle 21, placed above the sliding piece 6. This spindle 21 is provided in front with a screw and bears a matrix 22, supported in a bearing 23, which can be connected with the part 7 of the frame 1. Upon the upper side the said matrix 22 is formed as a rack, into which a ratchet 24 engages, which is also supported on a piece 23 and bears on a shaft a weight 25. Through the influence of the weight 25 the matrix 22 continuously strives to advance and presses, consequently, with the disk connecting-piece 22$^a$, continuously against the hinder part of the support, but is free to yield if it encounters a pressure in the opposite direction. As already stated, the spindle 21 bears a screw-thread. Consequently it can be screwed to and fro in the matrix. The spindle 21 bears, as shown in Fig. 5, at its end a tooth-wheel 26, in which a reversible dog 27 engages, which is placed eccentrically upon the prolonged driving-shaft 4 of the machine. This dog has a counterweight 28, whereby a continuous revolving of the tooth-wheel 26, and consequently an advance of the spindle 21, is caused. As, however, the spindle 21 is revolubly supported in the eyelet 20 of the arm 19, but is prevented by means of two set-rings from sharing the motion of the longitudinal axis, the said arm is obliged to move forward with the same, and thereby to impart to the sliding piece 6, together with the axle 4 and the saw 3, a continuous advance, while it notwithstanding allows of a yielding of the saw, and the spindle 21 allows of such in the direction of the axle.

Instead of the tooth-wheel and dog, as shown in Figs. 4 and 5, the devices shown in Figs. 6 and 7 may be employed. The same are characterized, essentially, by the arrangement of a strap 29, which passes over a roller 30 upon the shaft 21 and over the eccentric 31, connected with the shaft 4. At each revolution of the shaft 4 the strap 29 is stretched and thereby the spindle 21 caused to revolve somewhat. This arrangement has the advantage that it works with less noise than the arrangement shown in Figs. 4 and 5.

What I claim, and desire to secure by Letters Patent of the United States, is—

1. In a machine of the character described, the combination of the bearing-box 7, the sliding part 6 supported in the box 7, means for moving the part 6 in its bearing-box 7, a driving-shaft 4 journaled in part 6, the saw-supporting head adjustably mounted upon the part 6, the saw journaled in said head, and gearing between the shaft 4 and the saw, substantially as set forth.

2. In a machine of the character described, the combination of the bearing-box 7, the sliding part 6 supported in box 7 and having a rack 16, a pinion 15 engaging rack 16, means for operating pinion 15, a driving-shaft 4 journaled in part 6, a saw adjustably mounted upon part 6, and gearing between the shaft 4 and the saw, substantially as set forth.

In witness whereof I have hereunto set my hand in presence of two witnesses.

GUSTAV WAGNER.

Witnesses:
C. KAUFMANN,
E. SCHÖNHUT.